United States Patent
Nagatsuma et al.

(10) Patent No.: US 6,285,314 B1
(45) Date of Patent: Sep. 4, 2001

(54) PORTABLE GPS TYPE DISTANCE/SPEED METER CAPABLE OF CHANGING SAMPLING PERIOD OF GPS SIGNAL IN RESPONSE TO ARM SWINGING PERIOD

(75) Inventors: Hideaki Nagatsuma; Kazumi Sakumoto; Hiroshi Odagiri, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/546,773

(22) Filed: Apr. 11, 2000

(30) Foreign Application Priority Data

Apr. 12, 1999 (JP) .................................. 11-104565

(51) Int. Cl.$^7$ .............................. H04B 7/185; G01S 5/02
(52) U.S. Cl. .......................... 342/357.08; 701/213; 482/8
(58) Field of Search ...................... 342/357.08; 701/213; 482/8

(56) References Cited

U.S. PATENT DOCUMENTS 6,122,960 * 9/2000 Hutchings et al. ..................... 73/493

FOREIGN PATENT DOCUMENTS 10325736   12/1998 (JP) .

* cited by examiner

Primary Examiner—Theodore M. Blum
(74) Attorney, Agent, or Firm—Adams & Wilks

(57) ABSTRACT

A portable type distance/speed meter is designed for measuring a travel distance and a travel speed in response to GPS electromagnetic waves received by a GPS receiver. The portable type distance/speed meter is arranged by: a GPS (Global Positioning System) receiver for receiving GPS electromagnetic waves transmitted from GPS satellites to acquire positioning data from the received GPS electromagnetic waves in a predetermined sampling period; travel speed calculating means for calculating a travel speed of a user based upon the positioning data; timer means for measuring travel time of the user at the travel speed; travel distance calculating means for calculating a travel distance of the user based upon both the travel speed calculated by the travel speed calculating means and the travel time measured by the timer means; average travel speed calculating means for calculating an average travel speed of the user based upon the travel speed calculated by the travel speed calculating means; motion detecting means for detecting motion produced while the user walks, or runs to thereby output the motion detecting result as a motion signal; and sampling period changing means for entering the motion signal outputted from the motion detecting means, for changing the sampling period based upon the entered motion signal.

2 Claims, 6 Drawing Sheets

US 6,285,314 B1

PORTABLE GPS TYPE DISTANCE/SPEED METER CAPABLE OF CHANGING SAMPLING PERIOD OF GPS SIGNAL IN RESPONSE TO ARM SWINGING PERIOD

BACKGROUND OF THE INVENTION

1. Field of the Invention

The present invention generally relates to a portable GPS type distance/speed measuring apparatus. More specifically, the present invention is directed to a portable type distance/speed meter capable of calculating/displaying both a travel distance and a travel speed based upon positioning data acquired by receiving GPS electromagnetic waves, while being mounted on an arm of a user, like a wrist watch.

2. Description of the Related Art

In the GPS (Global Positioning System), 24 sets of the GPS satellites orbit on 6 sets of orbit courses located at an inclined angle of 55 degrees at a distance of approximately 20,200 km on the earth, and travel for approximately 12 hours per one turn. While navigation data required for positioning, transmitted from more than 3 GPS satellites under the most receivable condition are received by a GPS receiver, positioning calculations are carried out by measuring propagation delay time of these navigation data so as to determine travel direction/present position of a user.

In this GPS, two different frequencies "L1 (=1.57542 GHz)" and "L2 (=1.22760 GHz)" are prepared for the transmission frequencies of the GPS satellites. Since the C/A code (namely commercial-purpose code being free-opened) is transmitted at the frequency of 1.57542 GHz (equal to GPS transmission frequency "L1"), one GPS transmission frequency "L1" is utilized in general-purpose positioning operation. It should be understood that the GPS signal having this frequency "L1" is modulated in the PSK (Phase Shift Keying) modulating method by using the pseudonoise code, and then the PSK-modulated GPS signal is transmitted by way of the spread spectrum communication system. This pseudonoise code corresponds to the synthesized wave made from the C/A code used to discriminate the desirable GPS satellite from all of the GPS satellites, and also the navigation data such as the GPS satellite orbit, the GPS satellite orbit information, and the time information.

FIG. 5 is a schematic block diagram representing an arrangement of a GPS receiver 200 capable of receiving a GPS electromagnetic wave (namely, GPS signal having frequency of "L1 (=1.57542 GHz)") transmitted from a GPS satellite. As shown in FIG. 5, the GPS receiver 200 is arranged by a reception antenna 201, an L-band amplifying circuit 202, a down-converter circuit 203, a voltage comparing circuit 204, a message decrypting circuit 205, and a positioning calculating circuit 206. The reception antenna 201 receives GPS electromagnetic waves transmitted from the GPS satellites. The L-band amplifying circuit 202 amplifies a GPS signal having an L-band frequency among the received GPS signals. The down-converter circuit 203 performs a down-converting operation of the amplified GPS signal by multiplying this received GPS signal by a signal produced from a local oscillating circuit 107. The voltage comparing circuit 204 digitally converts the GPS signal down-converted by the down-converter circuit 203 into a digital GPS signal. In the message decrypting circuit 205, the digital GPS signal inputted from the voltage comparing circuit 204 is multiplied by a C/A code generated from a C/A code generating circuit 208 so as to acquire both navigation data and carrier wave phase information corresponding to a pseudodistance. The positioning calculating circuit 206 calculates positioning data by using both the navigation data and the carrier wave phase information, which are entered from the message decrypting circuit 205. It should also be noted that the local oscillating circuit 107 corresponds to such a circuit capable of producing a signal used to convert a received GPS signal into another signal having a desirable frequency.

Next, reception operation of this GPS receiver 200 will now be described. In FIG. 5, the L-band amplifying circuit 202 selectively first amplifies the GPS signal having the frequency of 1.57542 GHz received by the reception antenna 201. The GPS signal amplified in the L-band amplifying circuit 202 is entered into the down-converter circuit 203. This down-converter circuit 203 converts this entered GPS signal into a first IF (intermediate frequency) signal having a frequency of from several tens of MHz to 200 MHz by using the local oscillation signal produced from the local oscillating circuit 107, and furthermore, converts this first IF signal into a second IF signal having a frequency on the order of from 2 MHz to 5 MHz. Then, the voltage comparing circuit 204 enters thereinto this second IF signal so as to digitally convert the second IF signal into the digital GPS signal by employing a clock signal having a frequency several times higher than the frequency of this entered second IF signal. In this circuit, this digitally-converted GPS signal will constitute spectrum-spread data (digital signal).

This spectrum-spread data outputted from the voltage comparing circuit 204 is entered into the message decrypting circuit 205. Then, this message decrypting circuit 205 reverse-spreads the C/A code produced from the C/A code generating circuit 208 to the entered digital signal so as to acquire both the navigation data and the carrier wave phase information corresponding to the pseudodistance. The C/A code implies the pseudonoise code identical to that of the GPS satellite.

The above-explained reception operation is carried out with respect to the respective GPS satellites in this GPS receiver 200. Normally, the message decrypting circuit 205 of the GPS receiver 200 may acquire the navigation data and also the carrier wave phase information of 4 sets of the GPS satellites, and then the positioning calculating circuit 206 acquires the positioning data (speed, present position, time information etc.) based upon the acquired navigation data/carrier wave phase information. The positioning data acquired by the positioning calculating circuit 206 is outputted to a CPU (not shown) for controlling the overall reception operation of this GPS receiver 200, or externally outputted as a digital signal. Such a GPS receiver is utilized as a car navigation system by combining positional information of GPS with map information produced from a CD-ROM.

On the other hand, the above-explained GPS receiver 200 is realized in the form of such a portable type GPS receiving apparatus capable of measuring travel speeds/travel distances of persons, since the GPS receiver 200 may be supplied as a digital ASIC (Application Specific IC) due to current technical progresses in semiconductor fields. This portable type GPS receiving apparatus calculates the travel distance and the travel speed of the user based upon the positioning data acquired by employing the GPS receiver 200, and then displays both the travel distance and the travel speed.

Furthermore, since such a portable type GPS receiving apparatus is made compact and in light weight, this portable type GPS receiving apparatus may be mounted on an arm of a user like a wrist watch. It is proposed that this idea is very useful especially in the case that a marathon runner wants to measure both a running speed and a running distance. When such a portable type GPS receiving apparatus is mounted on the arm of the user, the GPS receiver mounted on this portable type GPS receiving apparatus normally calculates the measurement results as the travel speed and the travel distance of the user. The measurement results are constituted by superimposing the positional change of the entire user body on the positional change caused by the arm swinging action.

In this case, since the information which is desirably acquired by the user corresponds to both a travel speed and a travel distance calculated based on motion of the entire user body (will be referred to as "true motion" hereinafter), an error may be produced, which is adversely caused by the positional change by the arm swinging action. As a consequence, in the conventional portable type GPS receiving apparatus, an attention is paid that the arm swinging action is periodically changed along the forward/backward directions with respect to either the walking direction or the running direction, so that the adverse influence caused by the arm swinging action may be reduced by calculating the average value of the travel speeds acquired from the GPS receiver within a predetermined period.

However, as to the normal GPS receiving process operation executed in the GPS receiver, the GPS electromagnetic waves are received in a predetermined sampling period (for instance, 1-second interval), and then the positioning data is acquired from the received GPS electromagnetic waves. All of the positioning data about all of the positions cannot be acquired, which are periodically changed by the arm swinging action of the user. Therefore, even when the above-explained travel speeds are averaged, the travel speed originated from the true motion cannot be always calculated.

FIG. 6 is a graph representing a relationship between an amplitude of an arm swinging action and a sampling period of positioning data. A sine wave shown in FIG. 6 indicates an amplitude of an arm swinging action while time has passed. The GPS receiver always may acquire positioning data on this sine wave. In FIG. 6, assuming now that the period of this sine wave (namely, arm swinging period) is "T0", when the sampling operation of the positioning data of the GPS receiver is carried out in a period "T1" equal to the above-explained period "T0", travel speeds calculated in accordance with this sampling operation indicate instantaneous speeds at continuously fixed positions (a1, a2, a3, - - - , a5) on the trail of the arm swinging action. As a result, an average speed calculated from all of these travel speeds does not have a meaningful value. In other words, in this case, the travel speeds given to the user contain the large adverse influences caused by the arm swinging action, but do not indicate the travel speeds caused by the true motion.

Also, even when the sampling period is different from the arm swinging period "T0", if this sampling period is very approximate to the same period such as a period "T2", lengthy time is required in order to acquire the positional change in the arm swinging amplitude for 1 period as indicated in positions b1, b2, b3, - - - , b5 of FIG. 6. That is, lengthy measuring time is required so as to acquire the averaging effect. This implies that lengthy time is required until the travel speeds caused by the true motion are provided with the user.

SUMMARY OF THE INVENTION

The present invention has been made to solve the above-described problems, and therefore, has an object to provide a portable type distance/speed meter capable of calculating both a travel speed and a travel distance of a user from GPS electromagnetic waves received by a GPS receiver to provide these travel speed/distance with the user, and also capable of detecting an arm swinging period of a user who mounts this portable type distance/speed meter on his arm such as a wrist watch, and capable of changing a sampling period by the GPS receiver in response to the detected arm swinging period.

FIG. 1 is a block diagram indicating a principle arrangement of a portable type distance/speed meter according to an aspect of the present invention. That is, to achieve the above-described objects, the portable type distance/speed meter shown in FIG. 1, according to the aspect of the present invention, is comprised of: a GPS (Global Positioning System) receiver 10 for receiving GPS electromagnetic waves transmitted from GPS satellites to acquire positioning data from the received GPS electromagnetic waves in a predetermined sampling period; a travel speed calculating means 13 for calculating a travel speed of a user based upon the acquired positioning data; a timer means 15 for measuring travel time of the user at the calculated travel speed; a travel distance calculating means 14 for calculating a travel distance of the user based upon both the travel speed calculated by the travel speed calculating means 13 and the travel time measured by the timer means 15; an average travel speed calculating means 16 for calculating an average travel speed of the user based upon the travel speed calculated by the travel speed calculating means 13; a motion detecting means 11 for detecting motion produced while the user walks, or runs to thereby output the motion detecting result as a motion signal; and a sampling period changing means 12 for entering the motion signal outputted from the motion detecting means 11, for changing the sampling period based upon the entered motion signal.

Also, in the portable type distance/speed meter according to the present invention, the motion detecting means 11 detects an arm swinging action of the user to thereby output the swinging action detection result as the motion signal; and the sampling period changing means 12 enters the motion signal outputted from the motion detecting means 1 land calculates a period of the arm swinging action based upon the entered motion signal and changes the sampling period in response to the calculated arm swinging action period.

Therefore, in accordance with the above-explained portable type distance/speed meters of the present invention, both the travel distance and the average travel speed of the user are calculated based upon the GPS electromagnetic waves acquired from the GPS receiver 10. Furthermore, the sampling period used to acquire the positioning data is changed in response to the arm swinging period detected by the motion detecting means 11. As a result, the errors contained in the average travel speed can be reduced, which are caused by such a fact that the arm swinging period is made substantially equal to the sampling period.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiment modes of portable type distance/speed meters according to the present invention will be described more in detail. It should be understood that the present invention is not limited only to this embodiment mode. In this embodiment mode, descriptions are made in such a case that the portable type distance/speed meter according to the present invention is mounted on an arm of a user.

OVERALL ARRANGEMENT OF PORTABLE TYPE DISTANCE/SPEED METER

Figure 2:
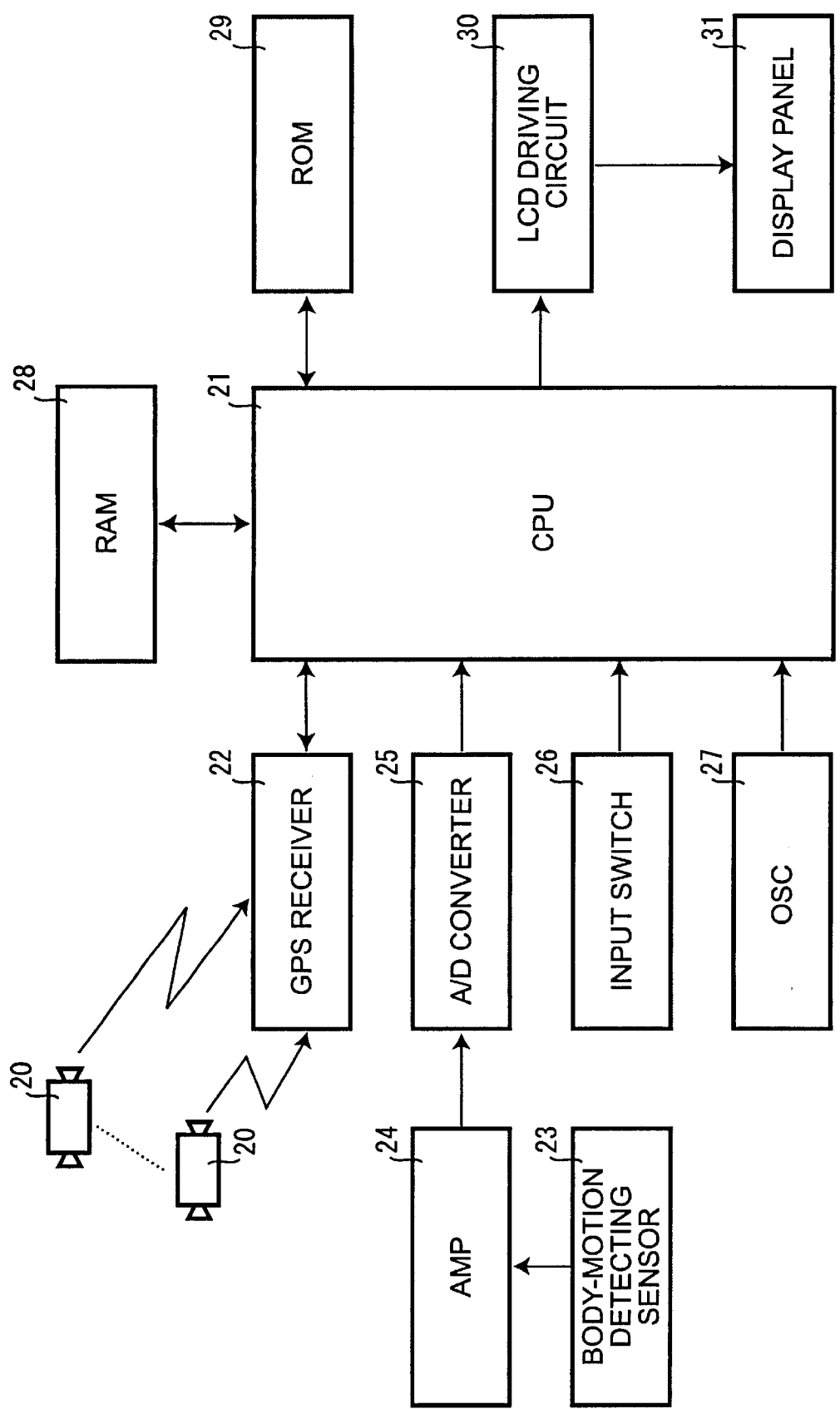
FIG. 2 is a schematic block diagram representing an arrangement of a portable type distance/speed meter according to an embodiment mode of the present invention.
Figure 5:
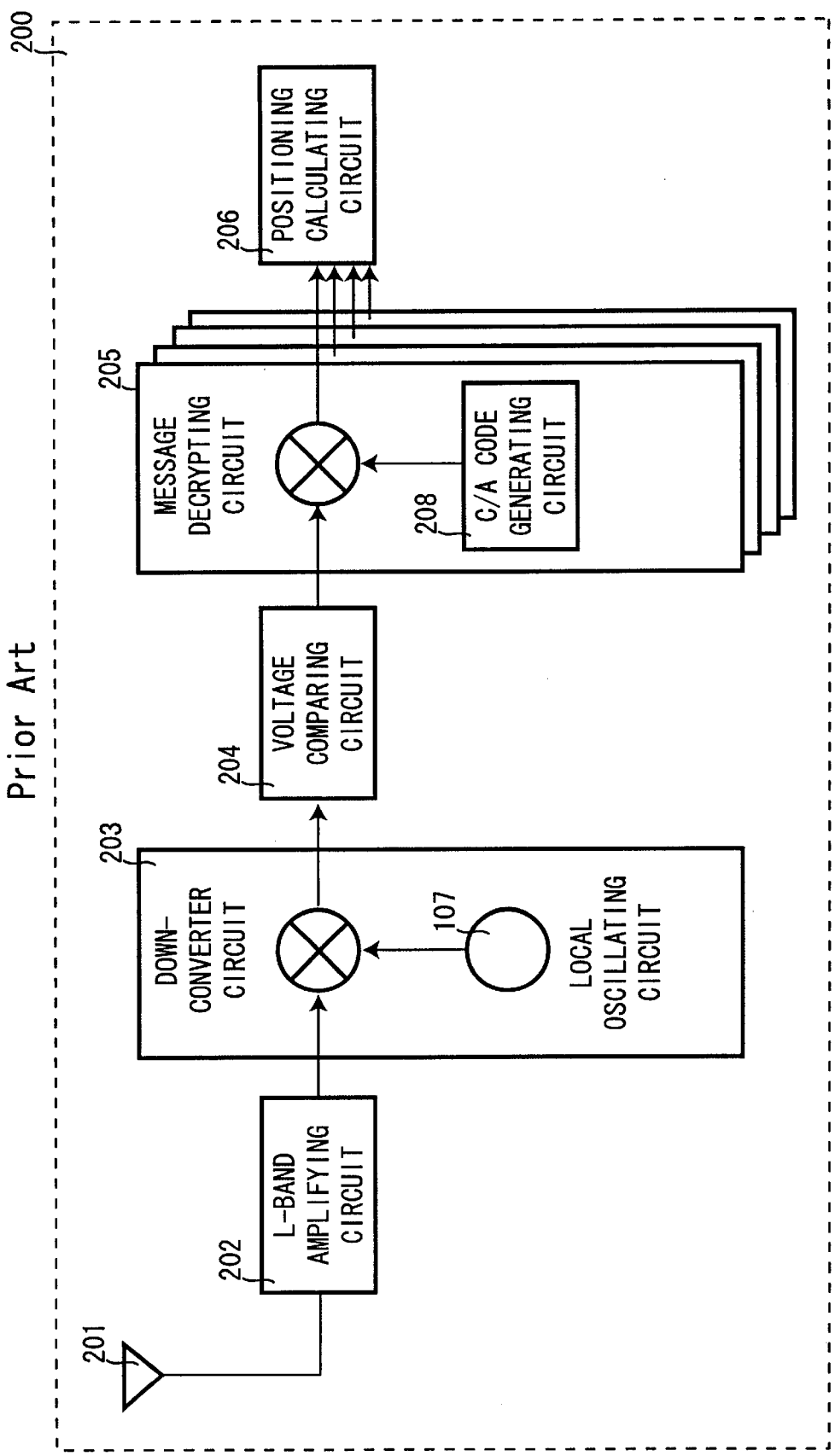
FIG. 5 is a schematic block diagram showing an arrangement of a conventional GPS receiver.
Figure 6:
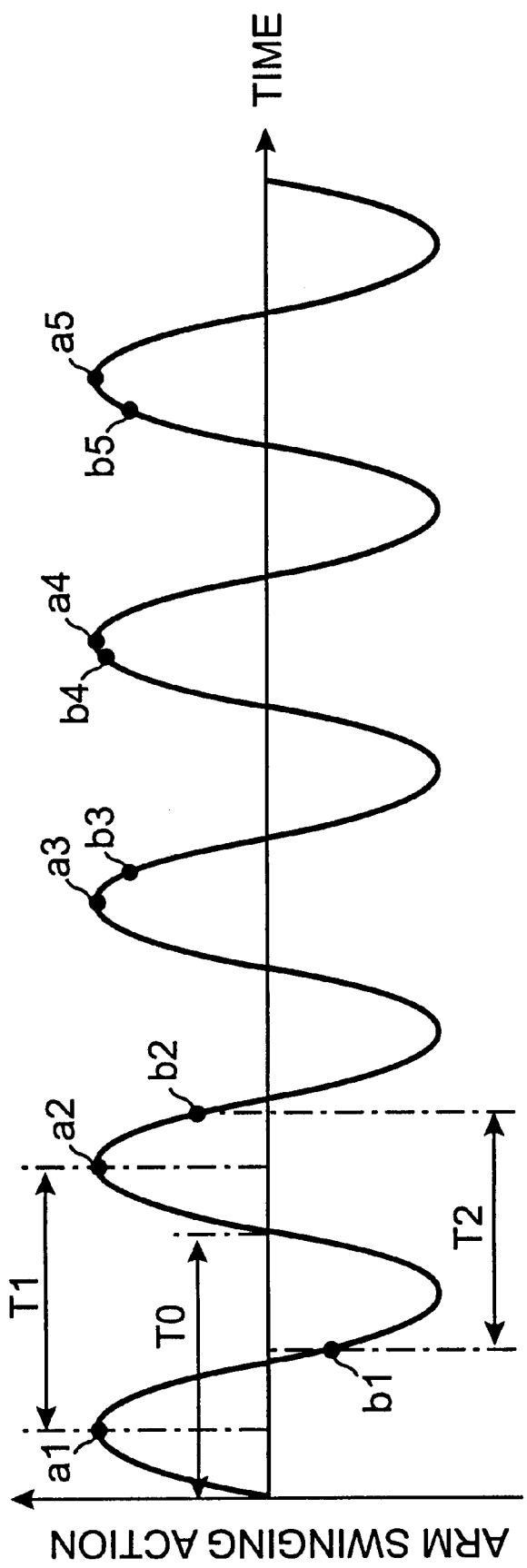
FIG. 6 is a diagram representing a relationship between an arm swinging amplitude and a sampling period of positioning data.

FIG. 2 is a schematic block diagram indicating an arrangement of a portable type distance/speed meter according to an embodiment mode of the present invention. As indicated in this drawing, this portable type distance/speed meter is arranged by employing a GPS receiver 22, a body-motion detecting sensor 23, an amplifier (AMP) 24, an A/D converter 25, a CPU (central processing unit) 21, and an LCD driving circuit 30. The major arrangement of this GPS receiver 22 is indicated in FIG. 5. The GPS receiver 22 receives GPS electromagnetic waves transmitted from a plurality of GPS satellites 20 so as to measure present altitude and also present latitude. The body-motion detecting sensor 23 corresponds to a move detecting means according to the present invention, and is made of an acceleration sensor, gyro-sensor, and so on. This body-motion detecting sensor 23 detects a move action (motion) when a user walks, or runs, such as an arm swinging action and vibrations produced when feet of this user stand on the ground, and thus, produces a motion signal in response to the move action of the user. The amplifier 24 amplifies the motion signal produced from the body-motion detecting sensor 23. The A/D converter 25 converts the analog motion signal amplified by the amplifier 24 into a digital motion signal. The CPU 21 executes various calculation process operations (will be explained later) so as to calculate a travel distance and a travel speed of the user. The LCD driving circuit 30 controls a display panel 31 constructed of an LCD (Liquid Crystal Display) and the like to display both the travel distance and the travel speed calculated by the CPU 21 on this display panel 31.

The portable type distance/speed meter is further arranged by using a ROM (read only memory) 29 for previously storing an operation program of the CPU 21, a RAM (random access memory) 28 utilized as a storage area used to store thereinto stride data (will be discussed later), and also as a work area of the CPU 21, an input switch 26 used to issue a starting instruction of distance/speed measuring operation and so on, and an OSC (oscillating circuit) 27 for producing a reference frequency signal in FIG. 2.

OPERATION OF PORTABLE TYPE DISTANCE/SPED METER

Next, a description will now be made of operations of the portable type distance/speed meter with the above-explained arrangement.

Figure 3:
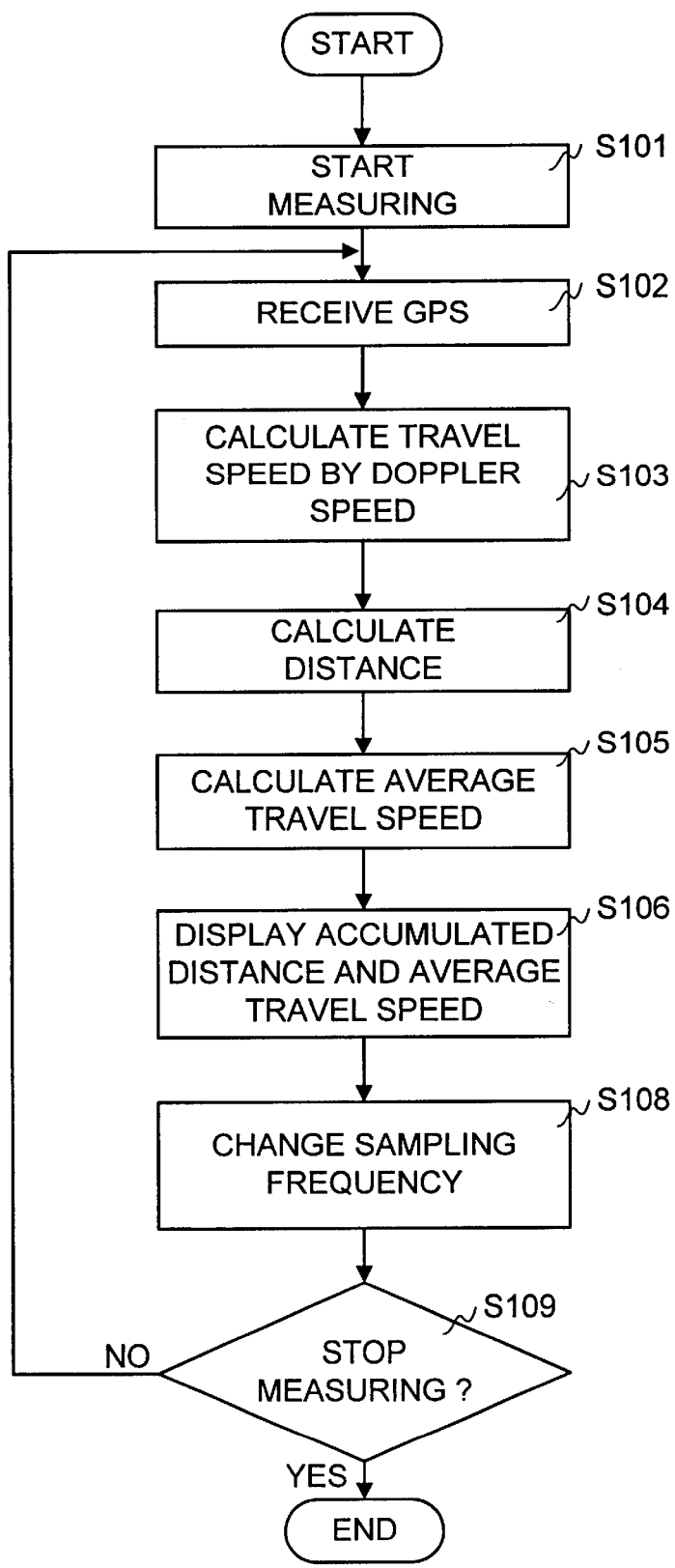
FIG. 3 is a flow chart describing operations of either a portable type distance meter or the portable type distance/speed meter according to the embodiment mode.

FIG. 3 is a flow chart describing the operations of either this portable type distance/speed meter or a portable type distance meter, according to the embodiment mode. In this flow chart of FIG. 3, when the input switch 26 is firstly manipulated by a user, this portable type distance/speed meter commences the measuring operations of a present travel speed and also of a travel distance at a step S101. As a result, at a step S102, the GPS receiver 22 commences the GPS reception. In this case, the GPS reception implies such a process operation that the positioning data are acquired from the GPS electromagnetic waves at a predetermined period, with a sampling interval set to, for example, 1 second.

Figure 1:
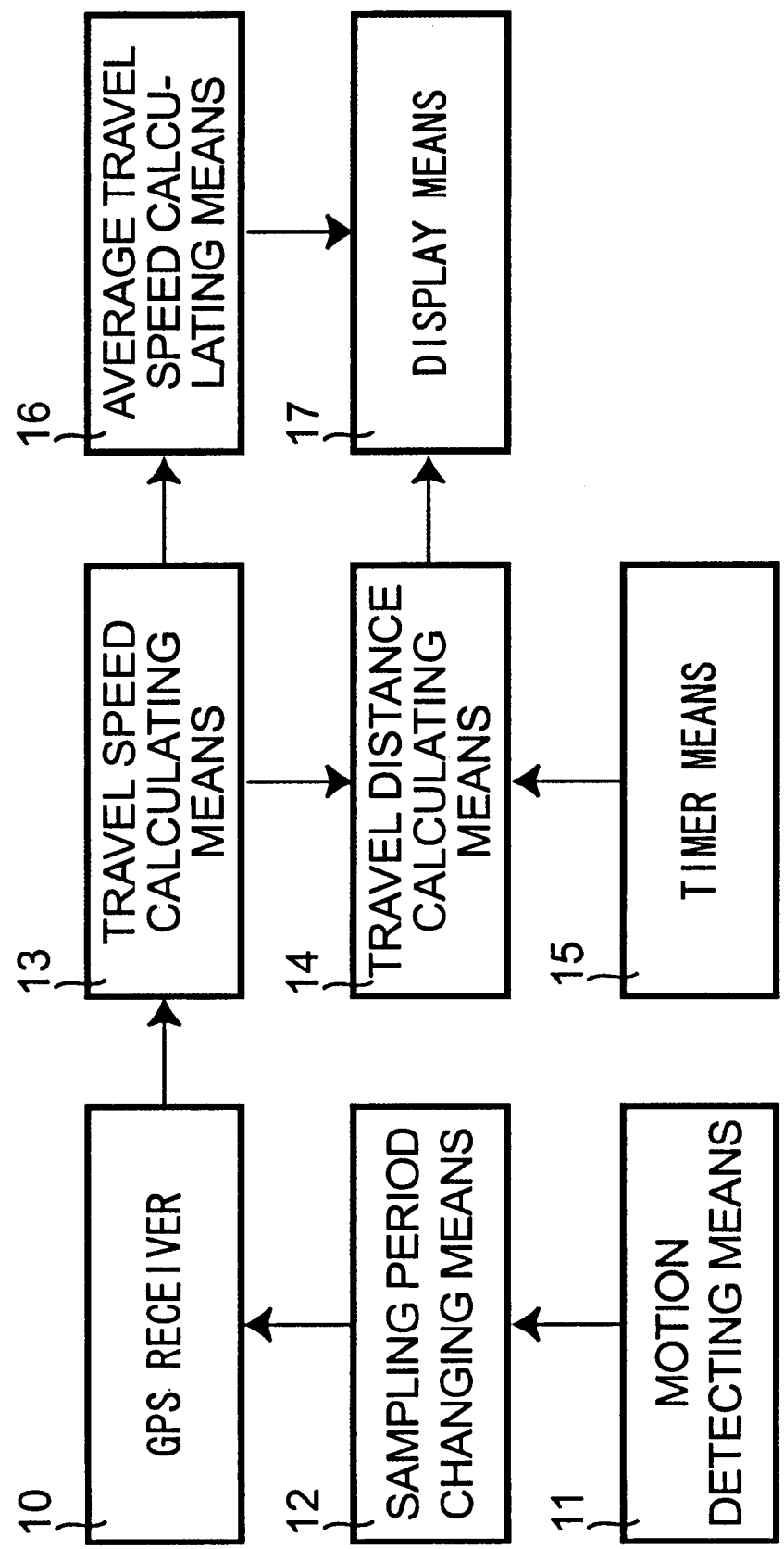
FIG. 1 is a block diagram indicating a principle arrangement of a portable type distance/speed meter according to the present invention.

Next, the CPU 21 calculates a travel speed from Doppler shift frequency information contained in the positioning data at a step S103, and then calculates a travel distance by accumulating this calculated travel speed at a step S104. Concretely speaking, this travel distance may be calculated as follows. That is, while a timer counter corresponding to the timer means 15 shown in FIG. 1 is employed so as to measure predetermined time, the travel speed obtained from the Doppler shift frequency information is multiplied by this measured predetermined time to obtain such a travel distance. Alternatively, this travel distance may be calculated in accordance with the below-mentioned manner other than the utilization of the Doppler shift frequency information. That is, while positional information at one time instant corresponding to a starting time instant of the above-explained predetermined time and also positional information at another time instant corresponding to an ending time instant of the time thereof are acquired, a travel distance may be calculated based on a difference between two pieces of the acquired positional information.

Next, the CPU 21 calculates an average travel speed of the travel speeds calculated at the step S103 (step S105). At this step S105, concretely speaking, this average travel speed calculation is performed as follows. That is, the travel speed calculated at the step S103 during the present measuring operation is accumulated with respect to the travel speeds which have been previously calculated within a predetermined time at the step S103. Thereafter, this accumulated speed result is divided by a total number of these accumulating operations.

Both the accumulated travel distance and the average travel speed calculated at the steps S104 and S105 are displayed on the display panel 31 under control of the CPU 21 via the LCD driving circuit 30 (step S106).

Subsequently, the CPU 21 calculates an arm swinging period of the user by executing an arm swinging period measuring process operation (will be explained later) so as to change the sampling period of the GPS reception executed in the GPS receiver 22 at a step S108. A newly-changed sampling period of the GPS reception is determined in response to the above-explained arm swinging period calculated based upon the arm swinging period measuring process operation. More specifically, in such a case that the arm swinging period is substantially equal to the sampling period of this GPS reception (for instance, when arm swinging period is located within a ±5%-range of sampling period), this newly-changed sampling period may be preferably made longer than this arm swinging period by several tens % thereof. Similarly, when a period defined by multiplying the arm swinging period by an integer is substantially equal to the sampling period, the sampling period is changed.

After this sampling period changing process operation at the step S108, the CPU 21 judges as to whether or not the user manipulates the input switch 26 to instruct a completion of the measuring operation of the travel distance/speed (step S109). At the step S109, when the completion of this measuring operation is instructed, a series of the above-described process operation indicated in FIG. 3 is accomplished. To the contrary, when such a completion of the measuring operation is not instructed, the process operation defined from the step S102 is again carried out so as to repeatedly calculate the travel distance and the travel speed as described above.

Figure 4:
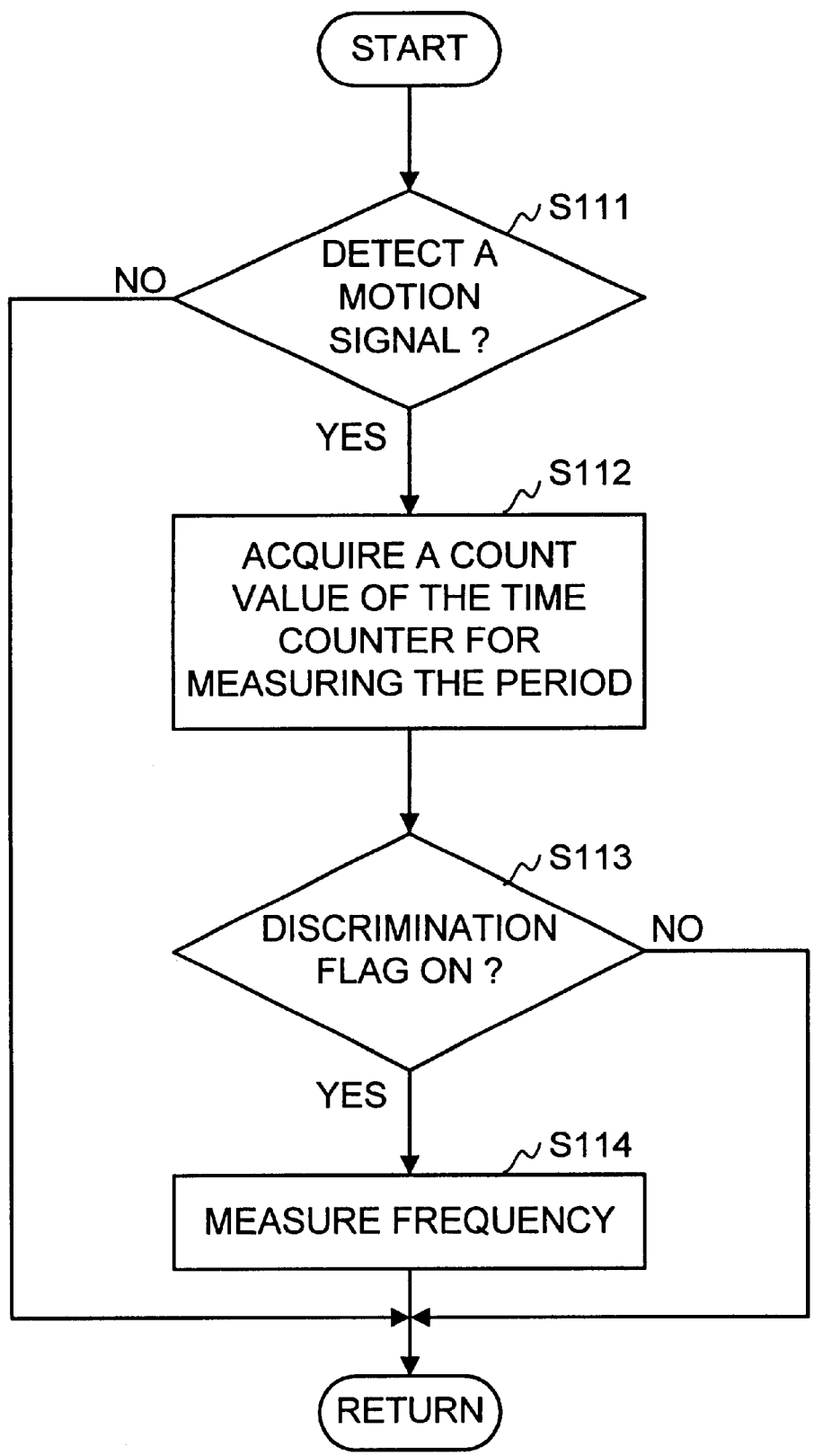
FIG. 4 is a flow chart describing an arm swinging period measuring process operation.

Next, the above-explained arm swinging period measuring process operation will now be explained. FIG. 4 is a flow chart describing the arm swinging period measuring process operation. In FIG. 4, the CPU 21 first judges as to whether or not a motion signal is detected by the body-motion detecting 'sensor 23 via the amplifier 24 and the A/D converter 25 at a step S111. In particular, this motion signal indicates a signal peak in this case. When the motion signal is not detected at this step S111, the arm swinging period measuring process operation is accomplished.

To the contrary, when the motion signal is detected at the step S111, the count value of the time counter for measuring the period, which has already been initiated by the CPU 21, is acquired at a step S112. To measure such an arm swinging period, it is required to acquire a count value two times, namely at a starting time instant of this arm swinging period and at an ending time instant thereof. Thus, the CPU 21 judges as to whether or not both the period starting time instant and the period ending time instant are acquired with reference to a discrimination flag at a step S113. This discrimination flag is used to discriminate that the acquisition of the period starting time instant has been carried out. At this step S113, when this discrimination flag is not yet set, the arm swinging period measuring process operation is accomplished.

At this step S113, when the discrimination flag is set, the CPU 21 measures a difference between the period starting time instant and the period ending time instant, which are indicated by the two count values, and then sets this difference as an arm swinging period at a step S114.

It should be understood that the arm swinging period measuring process operation is carried out in a sufficiently shorter interval than the arm swinging period. Also, the arm swinging period measuring process operation may be initiated by an interrupt operation by a hardware timer, or a software timer.

Therefore, in accordance with the above-explained portable type distance/speed meter of this embodiment mode, both the travel distance and the average travel speed of the user are calculated based upon the GPS electromagnetic waves acquired from the GPS receiver 22. Furthermore, since the sampling period used to acquire the positioning data is changed in response to the arm swinging period detected by the body-motion detecting sensor 23, so that the errors contained in the average travel speed when the arm swinging period becomes substantially equal to the sampling period can be reduced, and the effect made by averaging the travel speeds can be sufficiently achieved, so that this portable type distance/speed meter can provide such an average travel speed which is more approximate to the speed of the true motion to the user.

It should also be understood that the above-explained portable type distance/speed meter according to the embodiment mode may be preferably used as a wrist watch mounted on a human body. More specifically, when a marathon runner practices running, this portable type distance/speed meter may be suitably employed as a distance/speed meter. Accordingly, the portable type distance/speed meter may measure a travel speed and a travel distance by inputting lap time by the input switch 26.

As previously described in detail, in accordance with the portable type distance/speed meter of the present invention, the travel distance and the average travel speed of the user are calculated based upon the positioning data acquired by the GPS receiver in a predetermined sampling period. Furthermore, the motion of the user is detected by the motion detecting means, and then the sampling period of the GPS receiver is changed into the optimum sampling period in response to this motion detecting result. For instance, the arm swinging of the user is detected by the motion detecting means, and then the sampling period is changed in response to this detected arm swinging period. As a result, the errors contained in the average travel speed can be reduced, which are produced when the. arm swinging period becomes substantially equal to the sampling period, and the effect made by averaging the travel speeds can be sufficiently achieved, so that this portable type distance/speed meter can provide the more precise average travel speed to the user.

What is claimed is:

1. A portable type distance/speed meter comprising:

a GPS (Global Positioning System) receiver for receiving GPS electromagnetic waves transmitted from GPS satellites to acquire positioning data from the received GPS electromagnetic waves in a predetermined sampling period;

travel speed calculating means for calculating a travel speed of a user based upon said positioning data;

timer means for measuring travel time of the user at said travel speed;

travel distance calculating means for calculating a travel distance of the user based upon both said travel speed calculated by said travel speed calculating means and said travel time measured by said timer means;

average travel speed calculating means for calculating an average travel speed of the user based upon said travel speed calculated by said travel speed calculating means;

motion detecting means for detecting motion produced while the user walks, or runs to thereby output the motion detecting result as a motion signal; and sampling period changing means for entering said motion signal outputted from said motion detecting means, for changing said sampling period based upon the entered motion signal.

2. A portable type distance/speed meter as claimed in claim 1 wherein:

said motion detecting means detects an arm swinging action of the user to thereby output the swinging action detection result as the motion signal; and said sampling period changing means enters said motion signal outputted from said motion detecting means, and calculates a period of said arm swinging action based upon the entered motion signal, and changes said sampling period in response to said calculated arm swinging action period.

* * * * *